US005204164A

United States Patent [19]

Sangyoji et al.

[11] Patent Number: 5,204,164

[45] Date of Patent: Apr. 20, 1993

[54] IMAGE TRANSFERRED MATERIAL

[75] Inventors: Kazuo Sangyoji; Takemi Yamamoto, both of Nagoya; Shunichi Higashiyama, Yotsukaichi, all of Japan

[73] Assignee: Brother Kogyo Kabushiki Kaisha, Nagoya, Japan

[21] Appl. No.: 661,232

[22] Filed: Feb. 27, 1991

[30] Foreign Application Priority Data

| | | | |
|---|---|---|---|
| Mar. 2, 1990 | [JP] | Japan | 2-52543 |
| Mar. 29, 1990 | [JP] | Japan | 2-85171 |
| Apr. 3, 1990 | [JP] | Japan | 2-88472 |

[51] Int. Cl.[5] .................... B32B 9/00

[52] U.S. Cl. .................... 428/195; 428/200; 428/356; 428/551; 428/913; 428/914

[58] Field of Search .................... 430/126; 357/81; 428/195, 200, 356, 551, 913, 914

[56] References Cited

U.S. PATENT DOCUMENTS

| | | | |
|---|---|---|---|
| 4,199,356 | 4/1980 | Matsumoto et al. | 430/126 |
| 4,786,576 | 11/1988 | Bujese et al. | 430/126 |
| 4,858,073 | 8/1989 | Gregory | 361/388 |

*Primary Examiner*—Patrtick J. Ryan
*Assistant Examiner*—W. Krynski
*Attorney, Agent, or Firm*—Oliff & Berridge

[57] ABSTRACT

An image transferred material is disclosed, which is produced by transferring an image layer carried on a support to a medium, wherein an interlayer is provided between the image layer and the medium.

8 Claims, 5 Drawing Sheets

IMAGE TRANSFERRED MATERIAL

BACKGROUND OF THE INVENTION

This invention relates to an image transferred material having an image transferred onto a desired medium such as cloth, paper and like.

Hitherto, a method for transferring an electro-photographically copied image onto a desired medium such as cloth, wood, plastic plates, etc. has been known The method comprises forming an image on a surface-treated sheet by an electrophotographic method, laying the image-bearing sheet on a heat-welding sheet having a thermoplastic resin layer coated on a release paper such that the image-bearing surface is brought into contact with the resin layer, heat-pressing the two sheets with heat rolls, hot press or the like to adhere them, peeling off the surface-treated sheet to transfer the image on the heat-welding sheet, laying the image-bearing heat-welding sheet on a desired medium with which the image-bearing surface is brought into contact, followed by heat-pressing the sheet to the medium, and then peeling off the release paper from the thus adhered medium. The resulting image transferred material has the image layer and the thermoplastic resin layer on the medium.

Instead of using the electrophotographic method to form an image to be transferred, other methods such as a thermally transferring method, a thermally sublimating method and an ink jetting method can be applied to the above described image transfer method.

Another method is also known, a so-called "cycolor method" (tradename of The Meed Corporation, U.S.A.), wherein an image is formed using a photosensitive pressure-sensitive medium having provided on the surface microcapsules containing a dye precursor, a photocurable resin and a photopolymerizatin initiator, and a color developing medium having on the surface a color developer layer capable of color forming reaction with the dye precursor. In the method, the photosensitive pressure-sensitive medium is imagewise exposed to light to selectively harden the microcapsules due to the photocurable resin encapsulated therein, and the light-exposed microcapsule-bearing surface of the medium is then brought into contact with the color developer layer of the color developing medium, followed by applying pressure thereto to rupture unhardened microcapsules so that the encapsulated dye precursor is allowed to react with the color developer to thereby form a color image. An apparatus adapted for the method is described, for example, in JP-A-61-173981. (The term "JP-A" used herein means an unexamined published Japanese patent application.) The color developing medium having a color image formed in the color developer layer is laid on a heat-welding sheet having a thermoplastic resin layer coated on a release paper in the same manner as described above, followed by heat-pressing. After cooling them, a support of the color developing medium is peeled apart to transfer the color developer layer (image layer) on the heat-welding sheet which is then laid on a desired medium (e.g., paper, cloth, plastic films, etc.) to adhere the transferred color developer layer onto the medium. Thereafter, the release paper of the heat-welding sheet is peeled apart from the resulting medium. To attain this method, adhesions between the release paper of heat-welding sheet/the thermoplastic resin layer/the color developer layer/the support of the color developing medium and between the release paper/the thermoplastic layer/the color developer layer/the desired medium have been taken into consideration. In detail, reference may be made to Japanese Patent Application Nos. Sho-63-147805, and 63-250549 and Japanese Utility Model Application Nos. Sho-63-84914 and 63-84915.

According to the aforesaid methods, copied images can be transferred onto desired media such as cloth as described above. However, these methods cannot impart ornamental property beyond that of copied images. Moreover, an original with gold color or silver color cannot be faithfully reproduced by way of the aforesaid electrophotographic method and cycolor method, and these methods provide copied images only with reduced commercial value and back of reality and ornamental property. The same problems are also encountered when an original is a solid such as embroideries, glass beads, plastic beads and the like.

SUMMARY OF THE INVENTION

An object of this invention is to provide an image transferred material having a high commercial value and good ornamental property, whose image can express not only lustrous colors such as gold color and silver color but also solids.

Another object of this invention is to provide an image transferred material enabling formation of a light-color image with highly opacifying property on a deeply colored medium.

Still another object of this invention is to provide an image transferred material whose image can faithfully reproduce an original and can be additionally imparted ornamental property, if desired.

These objects have now be attained by an image transferred material produced by transferring an image layer carried on a support to a desired medium, wherein an interlayer is provided between the image layer and the medium.

BRIEF DESCRIPTION OF THE DRAWINGS

FIG. 6(*b*) is a sectional view of the image transferred material illustrated in FIG. 6(*a*).

FIG. 7(*b*) is a plane view from the direction indicated by arrow Y of the heat-welding sheet illustrated in FIG. 7(*a*).

FIG. 8(*b*) is a plane view from the direction indicated by arrow Z of the interlayer sheet illustrated in FIG. 8(*a*).

FIG. 9(*b*) is a plane view from the direction indicated by arrow X of the image transferred material illustrated by FIG. 9(*a*).

DETAILED DESCRIPTION OF THE PREFERRED EMBODIMENTS

The interlayer which is formed between the image layer and the medium in the image transferred material of this invention may contain a metallic component with or without an adhesive component (the first embodiment), may contain a substance imparting solid property (three-dimensional property) with or without an adhesive component (the second embodiment), or may contain at least one of dyes, pigments and perfumes, along with an adhesive component (the third embodiment). A thickness of the interlayer is preferably in a range from 10 microns to 300 microns, more preferably from 15 microns to 150 microns in the present invention.

First of all, the first embodiment of this invention is explained in detail below.

Figure 1:
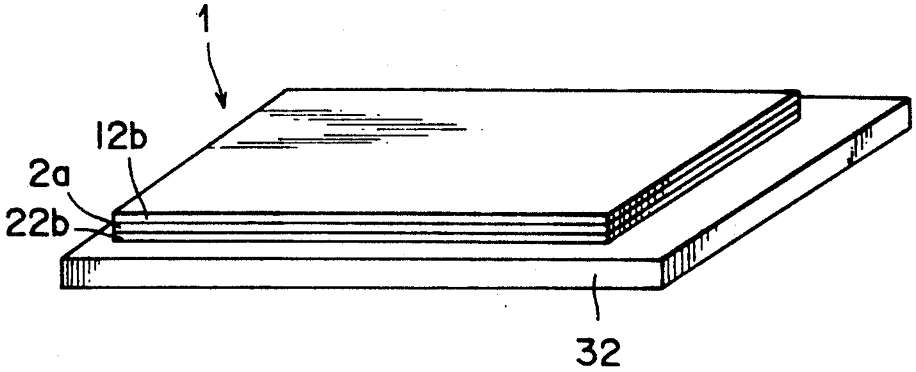
FIG. 1 is a slant view of an image transferred material of the first embodiment of this invention.

FIG. 1 illustrates image transferred material 1 obtained according to the first embodiment, which comprises medium 32 having thereon, in sequence, interlayer 22*b*, image layer 2*a* and thermoplastic resin layer 12*b*. The image layer 2*a* may be provided by any of an electrophotographic method, a thermally transferring method, a thermally sublimating method, an ink jetting method, and a cycolor method. Hereafter, production of the image transferred material 1 having an image produced by the cycolor method is explained in due course.

Figure 4:
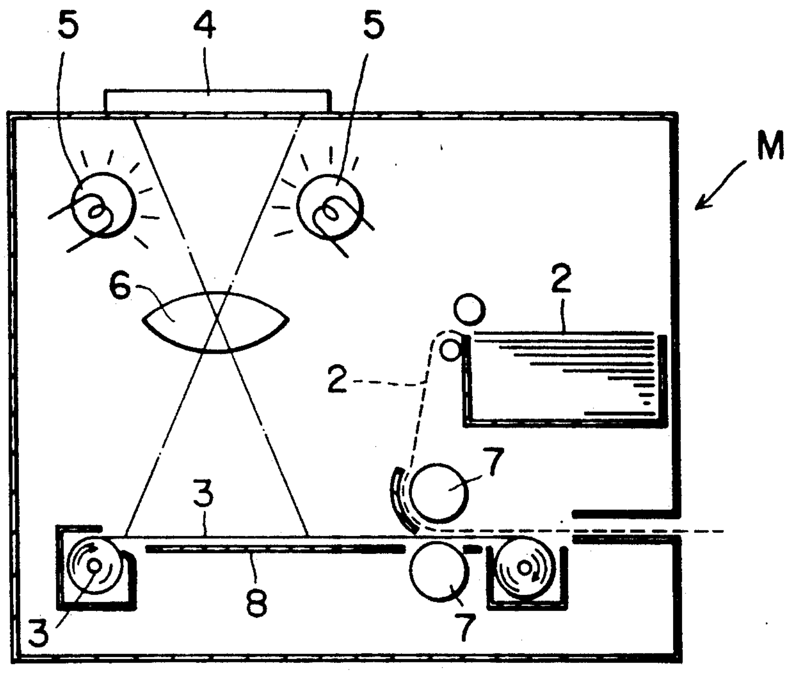
FIG. 4 illustrates a sectional view of an apparatus for forming a color image on a color developing medium.

An image is formed on color developing medium 2 by the following steps using color image-forming apparatus M as shown in FIG. 4.

photosensitive pressure-sensitive medium 3 carries on the surface thereof microcapsules encapsulating a dye precursor and a light-sensitive substance. The photosensitive pressure-sensitive medium 3 is rolled up on a supply roll such a manner that the microcapsule-carrying surface is the outside of the roll, and the rolled medium 3 is mounted on the apparatus M in its lower part and is forwarded to a wind-up roll set on the right side of the apparatus M as illustrated in FIG. 4. Light-exposing plate 8 is located beneath the unrolled medium 3 between the supply roll and the wind-up roll, and light source 5 is arranged above the exposure table 8 so as to irradiate the surface of original 4. Further, lens 6 is provided between the exposure table 8 and the light source 5 to form an image on the unrolled photosensitive pressure-sensitive medium 3 with light reflected at the surface of the original 4. Thus, the photosensitive pressure-sensitive medium 3 is light-exposed by the means composed of the light source 5, the lens 6 and the exposure table 8.

On the other hand, color developing medium 2 having color developer layer 2*a* on support 2*b* is placed above the wind-up roll in the apparatus M, and press rolls 7 are arranged between the exposure table 8 and the wind-up roll such a manner that the light-exposed medium 3 is brought into contact with the color developing medium 2 and pressure is applied thereto to develop a color image.

Using the apparatus M, a color image is formed in the following manner. Light from the light source 5 is reflected at the surface of the original 4 and is collected by the lens 6 to form an image on the photosensitive pressure-sensitive medium 3 unrolled on the exposure table 8. Then, the color developing medium 3 is laid on the thus light-exposed medium 3 by a conveying means (not shown) such that the color developer layer 2*a* is brought into contact with the microcapsule-carrying surface of the light-exposed medium 3, and they are passed through the press rolls 7, whereby unhardened microcapsules on the light-exposed medium 3 are ruptured and the encapsulated dye precursor flows out to react with the color developer on the color developing medium 2. Thus, a color image is developed in the color developer layer (image layer) 2*a* of the color developing medium 2.

Figure 2:
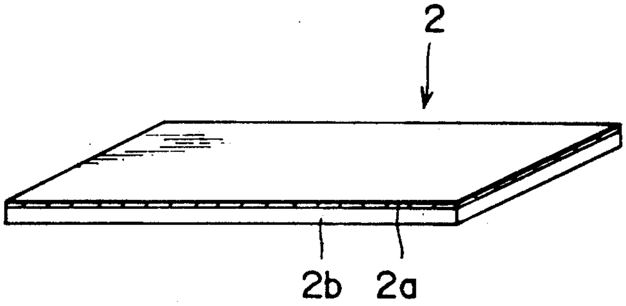
FIG. 2 is a slant view of a color developing medium used in the first embodiment of this invention.

As the color developing medium 2 having the support 2*b* and the color developer layer 2*a* as shown in FIG. 2, those having a layer-separable structure are used in this embodiment. The support possesses a relatively good releasability, and examples include glassine paper, polyester films, polyethylene film, polypropylene film and the like. The color developer layer is formed using a mixture of a phenolic compound (e.g., p-phenylphenol) or an aromatic carboxylic acid compound (e.g., salicylic acid, gallic acid, and propyltannic acid) with a thermoplastic binder which is added to an extent not to hinder the color forming reaction.

Then, the image formed on the color developing medium 2 is transferred to heat-welding sheet 12.

Figure 3:
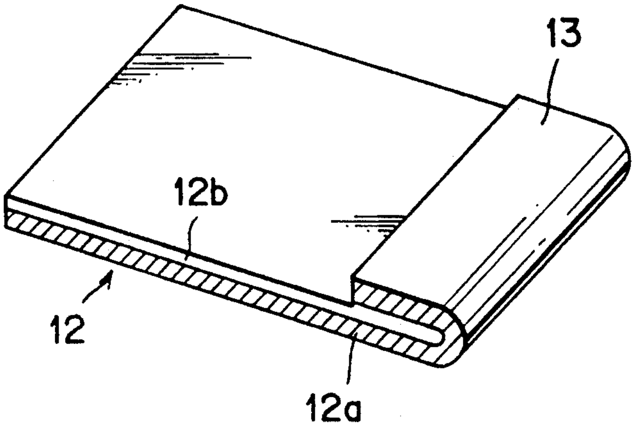
FIG. 3 is a slant view of a heat-welding sheet used in the first embodiment of this invention.

The heat-welding sheet 2 has transparent thermoplastic resin layer 12*b* on sheet material 12*a*, as illustrated in FIG. 3. Adhesion between the sheet material 12*a* and the thermoplastic resin layer 12*b* is adjusted such that it is larger than adhesion between the support 2*b* and the color developer layer 2*a* of the color developing medium 2, but it is small enough for the sheet material 12*a* and the thermoplastic resin layer 12*b* to separate at interface Any material can be used as the sheet material 12*a* of the heat-welding sheet 12 as long as it does not deform upon heat pressing as described below, and examples include various plastic films and paper. Preferred is glassine paper coated with a silicone based releasing agent. Examples of the thermoplastic resin used include vinyl resins such as ethylene/vinyl acetate copolymers, rosin esters, vinyl alcohol/vinyl acetate copolymers, vinyl alkyl ether/maleic anhydride copolymers, polyvinyl chloride, and vinyl chloride/vinyl acetate copolymers; acrylic resins such as polyethyl acrylate, polybutyl methacrylate, and polymethyl cyanoacrylate; styrene resins; polyamide resins; and waxes, which may be used alone or in combination thereof.

For example, the heat-welding sheet 12 can be prepared in the following manner. Eight parts by weight of a styrene/acrylate copolymer emulsion (solid content 41 wt %) and 12 parts by weight of an ethylene/vinyl acetate copolymer emulsion (solid content 40 wt %) are mixed and coated on a silicone-treated glassine paper (sheet material 12*a*) using a bar coater #12, followed by drying in an oven at about 120 degree C. for 60 seconds to form a thermoplastic resin layer. Then, one end of the heat-welding sheet 12 is doubled as shown in FIG. 3. Since the thermoplastic resin layer 12*b* is not exposed at doubled portion 13, the portion does not exhibit adhesiveness even after heating and it serves as a holding portion when the support 2*b* of the color developing medium 2 is peeled apart from the heat-welding sheet 12 in the subsequent step.

The aforesaid image-formed color developer layer 2*a* of color developing medium 2 is laid down on the thermoplastic resin layer 12*b* of the heat-welding sheet 12, and they are passed through heat-press rolls heated at about 140 degree C. to adhere. After cooling to room temperature, the support 2*b* of the color developing medium 2 is peeled apart to leave only the color developer layer 2*a* on the thermoplastic resin layer 12*b* of the heat-welding sheet 12.

While a color developing medium capable of layer separation at interface between the support and the color developer layer is used in this embodiment, other color developing media which do not easily undergo such layer separation, like "Cycolor" (tradename of a color developing paper, sold by The Meed Corporation), can also be used. In the case, however, a paper-peeling device for image transfer as described in Japanese Utility Model Application No. Sho-63-79364 is employed to peel off the support utilizing physical properties of the color developer layer and mechanical relationship in layer separation.

Interlayer 22*b* is then provided on the color developer layer 2*a* thus transferred on the heat-welding sheet 12.

The interlayer 22*b* is composed of a mixture or laminate of a metallic substance and a compound (or composition) which is capable of adhering the color developer layer 2*a* and a medium to which an image is transferred, such as those having heat-sensitive, pressure-sensitive, light-sensitive or anaerobic adhesiveness. The compound (or composition) used with the metallic substance is preferably a heat-sensitive adhesive.

Typical formulations of these adhesive composition are as follows:

metallic substance: 5% by weight of aluminum;

heat sensitive adhesive: a mixture of 100 parts of a styrene-modified ethylene/vinyl acetate copolymer, 10 parts of a rosin ester as an adhesiveness-imparting agent, and 10 parts of a wax as a plasticizer;

pressure-sensitive adhesive: a mixture of 100 parts of a polyacrylate, 30 parts of a rosin ester as an adhesiveness-imparting agent, and 5 parts of a chlorinated paraffin as aplasticizer;

photosensitive adhesive: a mixture of 100 parts of a prepolymer (e.g., unsaturated polyesters, epoxy acrylate, urethane acrylates, etc.), and 1 to 5 parts of a polymerization initiator (e.g., benzophone, benzoyl peroxide, etc.); and anaerobic adhesive: a mixture of 100 parts of polyethylene glycol diacrylate, 2 parts of cumene hydroperroxide, and 0.4 part of hydroquinine as a polymerization inhibitor.

Figure 5:
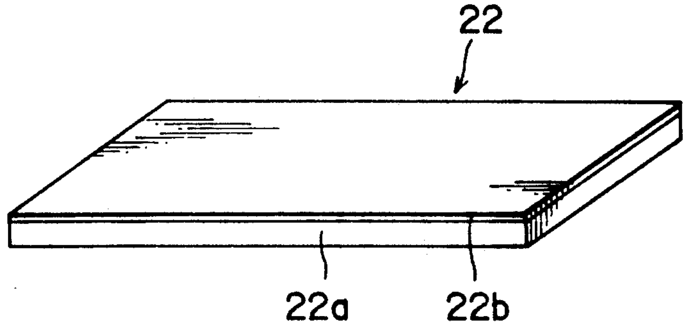
FIG. 5 is a slant view of an interlayer sheet.

For example, the interlayer 22*b* is provided using interlayer sheet 22 as shown in FIG. 5, wherein the sheet material 22*a* (e.g., a silicone-treated kraft paper is coated with interlayer 22*b* composed of a heat-sensitive adhesive (e.g., a styrene-modified ethylene/vinyl acetate copolymer) containing 5 wt % of a metal powder (e.g., an aluminum powder).

The aforesaid color developer layer (image layer) 2*a* which has been transferred onto the heat-welding sheet 12 is brought in contact with the interlayer 22*b* of the interlayer sheet 22 and they are passed through heat-press rolls of about 140 degree C. to adhere. After cooing to room temperature, the sheet material 22*a* of the interlayer sheet 22 is peeled off to leave the interlayer 22*b* on the heat-welding sheet 12.

Then, heat-welding sheet 12 carrying the interlayer 22*b* is press-adhered to medium 32 such as cloth, paper, plastic films, etc. via the interlayer 22*b*. Finally, the sheet material 12*a* of the heat-welding sheet 12 is removed to obtain the image transferred material 1 as shown in FIG. 1.

In this embodiment, any metallic foil or powder can be used as a metallic substance in the interlayer 22*b*, and further the interlayer 22*b* does not necessarily contain an adhesive component.

According to the first embodiment as described above, the interlayer containing a light-reflective metallic component intervenes between the image layer and the desired medium so that the resulting image transferred material possesses highly ornamental property due to the reflected light. Further, the metallic component-containing interlayer exhibits high opacifying power which enables formation of light-color images on deeply colored media. Furthermore, when the interlayer contains an adhesive component, the interlayer is firmly adhered to the medium.

A thickness of the interlayer of the first embodiment is in a range from 30 microns to 150 microns.

Next, the second embodiment of this invention is explained in detail below.

Interlayer sheet 22 used in this embodiment has interlayer 22*b* containing a substance imparting solid (three-layer) dimensional) property, e.g., a foaming agent, on sheet material 22*a*. For example, such an interlayer sheet is prepared by coating a silicone based releasing agent on a sheet of kraft paper and further coating thereon a heat-sensitive adhesive (e.g., a styrene-modified ethylene/vinyl acetate copolymer) containing as a foaming agent 15 wt % of thermally expansive microspheres having isobutane encapsulated with the shell of a vinylidene chloride/acrylonitirile copolymer.

Figure 6A:
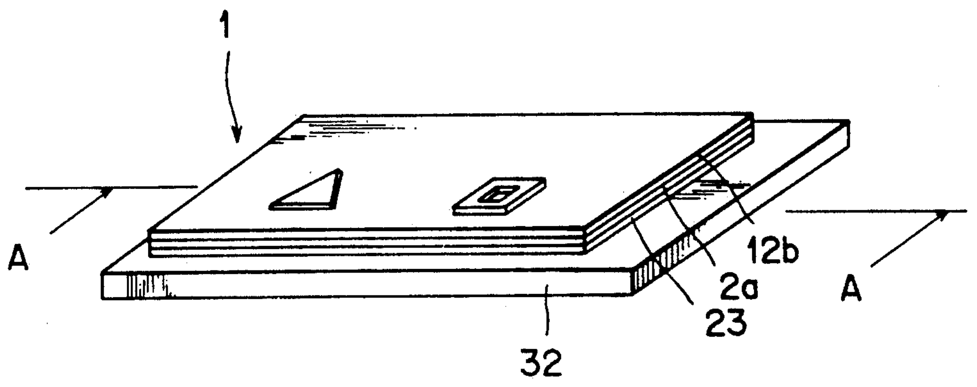
FIG. 6(*a*) is a slant view of an image transferred material of the second embodiment of this invention.
Figure 6B:
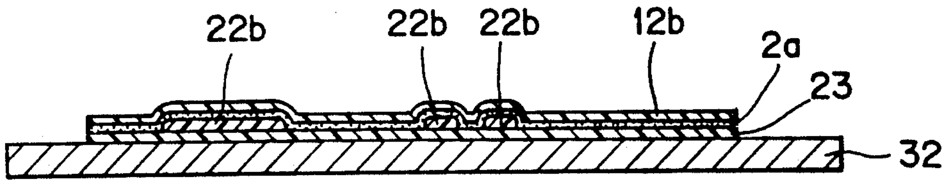

In this embodiment, image transferred material 11 having a solid image as shown in FIGS. 6(*a*) and (*b*) is obtained, as follows. First, the interlayer 22*b* is formed on the sheet material 22*a* imagewise according to intended solid images (triangle and square with open inside in the case of forming the image transferred material shown in FIG. 6(*a*)). The interlayer sheet 22 thus prepared is laid on heat-welding sheet 12 having color developer layer (image layer) 2*a*, which has been transferred in the same manner as in the first embodiment, such that the imagewise formed interlayer 22*b* is brought into contact with the color developer layer 2*a*, and the two sheets are passed through heat-press rolls of about 140 degrees C., whereby the heat-welding sheet 12 and the interlayer 22*b* are melt-adhered. After cooling to room temperature, the sheet material 22*a* of the interlayer sheet 22 is peeled off and then the entire surface of the color developer layer 2*a* partly adhered with the interlayer 22*b* is coated with heat-sensitive adhesive 23 which is the same as that used for the interlayer 22*b* except for containing no foaming agents. The resulting heat-welding sheet 12 is laid down on medium 32 with the coated heat-sensitive adhesive 23 intervening therebetween. By heat-pressing the heat-welding sheet 12 to the medium 32, the sheet 12 is adhered thereto and at the same time the thermally expansive microspheres contained in the interlayer 22*b* expand to provide a solid image. Thereafter, the sheet material 12*a* of the heat-welding sheet 12 is removed to obtain the image transferred material 11 as shown in FIGS. 6(*a*) and (*b*).

In this embodiment, the interlayer 22*b* is not necessarily provided imagewise on the color developer layer (image layer) 2*a* and it may be provided on the entire surface of the layer 2*a*. In the case, the resulting image transferred material possesses solid property oh the entire surface thereof. Instead of using a foaming agent in the interlayer 22b, glass beads, plastic plates or plastic powder may be used along with the heat-sensitive adhesive which may also be replaced with a pressure-sensitive, light-sensitive or anaerobic adhesive. Further, when the foaming agent or plastic substances used in the interlayer or the medium itself has an adhesive property, the interlayer does not necessarily contain an adhesive component.

Since the interlayer imparts solid property according to the second embodiment, the resulting image transferred material can possess good ornamental property. With an interlayer having high opacifying power due to inclusion of the solid property-imparting substances, a light-color image can also be formed clearly even on a deeply colored medium.

A thickness of the interlayer 22b is in a rang from 50 microns to 100 microns. A thickness of the interlayer 23 is in a range from 15 microns 150 microns.

Turning now to the third embodiment of this invention, the interlayer used in this embodiment is printed with an ink containing a dye, a pigment or a perfume.

Figure 7A:
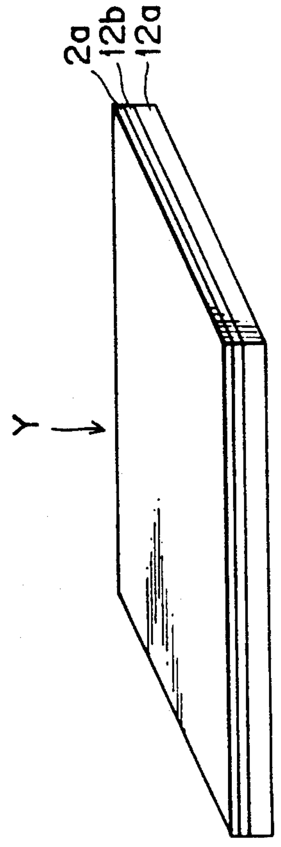
FIG. 7(*a*) is a slant view of a heat-welding sheet having a color developer layer welded thereon, which is used in the third embodiment of this invention.
Figure 7B:
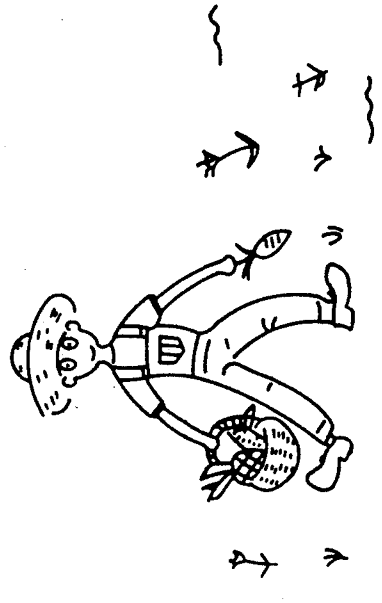

In this embodiment, color developer layer (image layer) 2a is transferred to heat-welding sheet 12 in the same manner as in the first and second embodiments. The thus obtained heat-welding sheet 12 is shown in FIG. 7(*a*), wherein the image formed on the sheet 12 is a mirror image of original 4 as shown in FIG. 7(*b*) when viewed from the direction Y in FIG. 7(*a*).

Figure 9A:
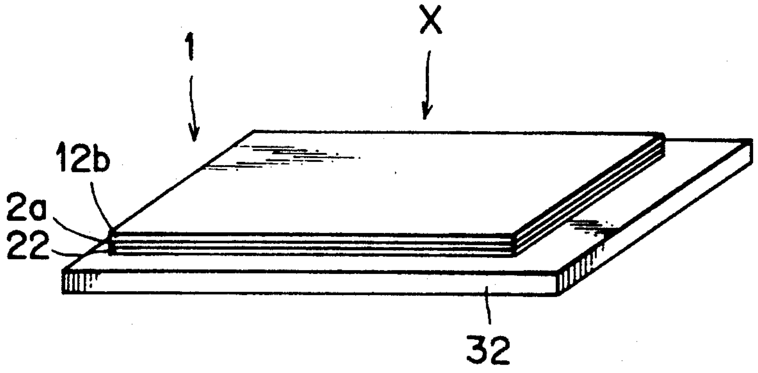
FIG. 9(*a*) is a slant view of an image transferred material of the third embodiment of this invention.
Figure 9B:
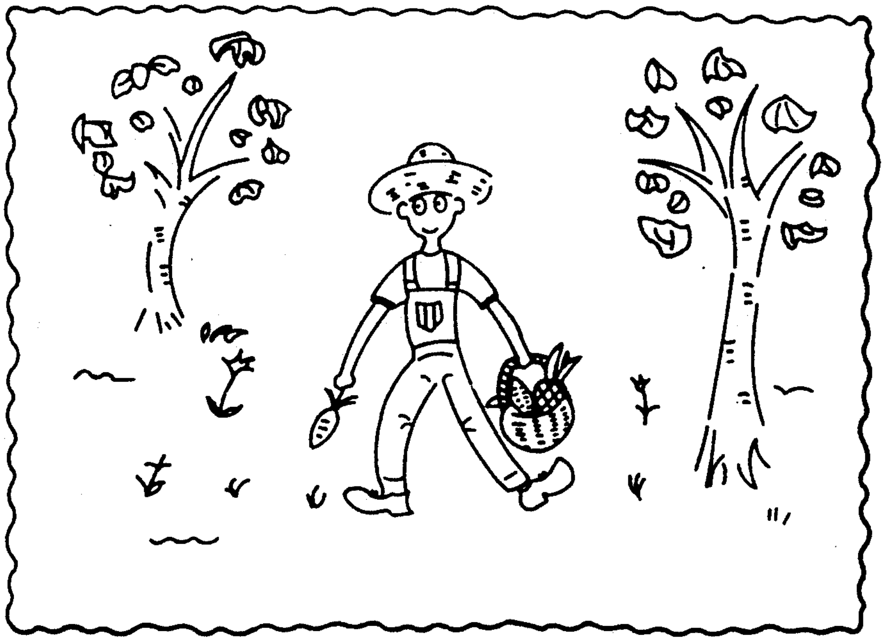

Then, the interlayer of this embodiment is provided on the color developer layer 2a transferred to the heat-welding sheet 12 and the other side of the interlayer is brought into contact with medium 32, followed by heat-pressing with heat-press rolls or an iron heated at about 140 degree C. to melt-adhere the heat-welding sheet 12, the interlayer 22 and the medium 32. Alternatively, the interlayer is provided on the medium 32 and the other side of the interlayer is brought into contact with the color developer layer 2a, and subsequently, they are heat-pressed in the same manner as described above. If desired, the sheet material 12a of the heat-welding sheet 12 is then peeled off to obtain image transferred material 1 as shown in FIG. 9(*a*).

Figure 8A:
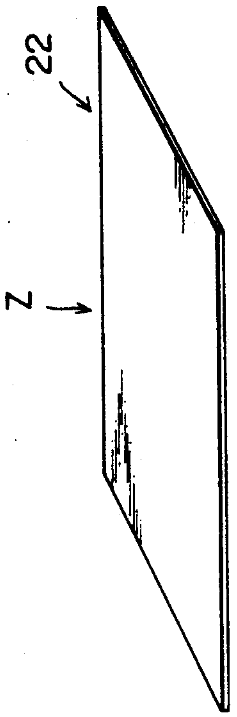
FIG. 8(*a*) is a slant view of an interlayer sheet used in the third embodiment of this invention.
Figure 8B:
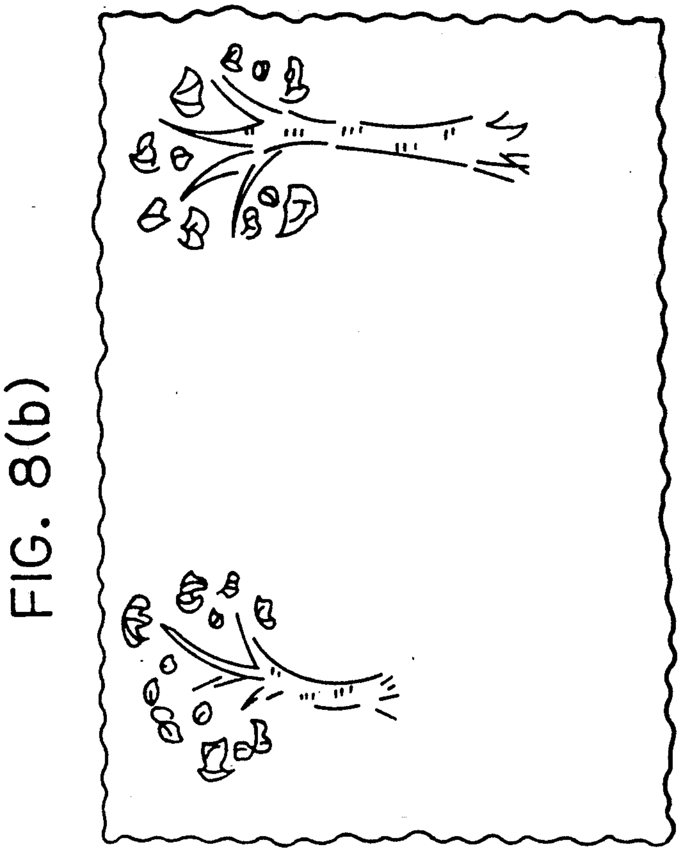

The interlayer 22 of this embodiment is a self-supporting sheet such as a heat-sensitive adhesive film, and it is drawn or printed, for example, with oily paints as shown in FIG. 8(*b*) which is a plane view from the direction Z of the interlayer 22 in FIG. 8(*a*). By using such an interlayer, a composite image of the original and the picture drawn on the interlayer is formed on the resulting image transferred material 1 as shown in FIG. 9(*b*) which is a plane view from the direction X of the material 1 in FIG. 9(*a*).

The interlayer 22 may also be a heat-sensitive adhesive film on which pattern, e.g., flower patterns, are drawn or printed with an ink containing perfume-encapsulating microcapsules. In the case, only the flower portion of the resulting image transferred material emit fragrance, enhancing its ornamental property.

The perfume-encapsulating microcapsules can be prepared by physical or mechanical methods such as an in-air suspension (fluidized bed) method, a spray granulation method, a pan-coating method, an electrostatically combining method, and a vacuum deposition method; or physicochemical or chemical microcapsulation methods such as an interfacial polymerization method, an in-situ polymerization method, a complex coacervation method, a method utilizing the phenomenon of phase separation from organic solvents, an in-liquid drying microcapsulation method, a melt-disperse cooling microcapsulation method, and an in-liquid shell-hardening microcapsulation method.

In the physical or mechanical methods, microcapsulation is effected using, as a shell material, water-soluble substances such as gelatin, gum arabi, starch, polyvinyl pyrrolidone, carboxymethyl cellulose, hydroxyethyl cellulose, methyl cellulose, polyvinyl alcohol, and polyacrylic acid; water-insoluble substances such as ethyl cellulose, cellulose acetate, polymethacrylates, nylon, polyethylene, nitrocellulose, and silicone; waxes such as paraffin, carnauba, bee's wax, stearic acid, palmitic acid, stearyl alcohol, and glyceryl stearate; and substances soluble in intestine such as shellac, cellulose acetate phthalate, and cellulose acetate butyrate.

On the other hand, the aforesaid physicochemical or chemical microcapsulation is effected using, as a shell material, polyamides, polyurethanes, polyesters, polysulfonamides, polyureas, epoxy compounds, polysulfonates, polycarbonates, polyols, polyisocyanates, polyacrylic acid, polyamines, acrylate compounds, polysulfides, urea, gelatin, rubbers, ethyl cellulose, phenolic resins, maleic acid resins, polyvinyl chloride, polyvinyl acetate, polyvinylidene chloride, polyacrylic acid salts, waxes, fatty acids, polyethylene, polyvinyl alcohol, and the like.

Examples of a perfume which is encapsulated in the microcapsules include vegetable perfumes such as lemon oil, orange oil, petigrain oil, neroli oil, bergamot oil, lavender oil, spike oil, patchouli oil, peppermint oil, rosemary oil, thyme oil, clary sage oil, palmarosa oil, ginger grass oil, lemongrass oil, citronella oil, vetiver oil, bois de rosa oil, cinnamon oil, rose oil, sandalwood oil, jasmine oil, tuberose flower oil, and star anise oil; fatty acid esters such as formates, acetates, propionates, butyrates, valerates, heptylates, heptynecarboxylates, laurates, and myristates; aromatic acid esters such as benzoates, phenylacetates, cinnamates, phthlates, salicylates, anisates and anthranilates; hydrocarbons such as cyclic terpene hydrocarbons, sesquiterpenes, and aromatic hydrocarbons; alcohols such as aliphatic alcohols, olefinic terpene alcohols, cyclic terpene alcohols, sesquiterpene alcohols, and aromatic alcohols; aldehydes such as aliphatic aldehydes, and aromatic aldehydes; and ketones such as aliphatic ketones, cyclic terpene ketones, and aromatic ketones.

Further, the interlayer of third embodiment may be a heat-sensitive adhesive film made of a mixture of an adhesive component and a pigment, for example, a mixture of 50 parts by weight of a styrene-modified ethylene/vinyl acetate copolymer, 25 parts by weight of an olefin wax, 25 parts by weight of a rosin ester, and 10 parts by weight of a white pigment (e.g., titanium oxide). When color developer layer (image layer) 2a which has been transferred on heat-welding sheet 12 is heat-pressed to medium 32 with such a white interlayer in the same manner as described above, an image transferred material having a clear image with highly opacifying property can be obtained even if the image is lightly colored and the medium is deeply colored.

A thickness of the interlayer of the third embodiment is in a range from 50 microns to 300 microns.

The adhesive component of the interlayer used in this embodiment is not limited to a heat-sensitive adhesive and any other adhesive such as pressure-sensitive, light-sensitive or anaerobic adhesives can be used as long as it adheres color developer layer 2*a* and medium 32 on which an image is provided.

According to the third embodiment as described above, the ornamental property of image transferred materials can be improved with the interlayer containing at least one of dyes, pigments and perfumes intervening between the image layer and the desired medium. Further, the image layer and the medium are firmly adhered due to the adhesive component in the interlayer.

While the invention has been described in detail and with reference to specific embodiments thereof, it will be apparent to one skilled in the art that various changes and modifications can be made therein without departing from the spirit and scope thereof.

What is claimed is:

1. An image transferred material comprising an interlayer on a surface of a desired medium and an image layer formed on said interlayer, said image layer and said interlayer being thermally transferred onto said desired medium, said interlayer comprising at least a metallic component and an adhesive component.

2. The image transferred material according to claim 1, wherein said desired medium comprises one of cloth, paper and plastic film.

3. The image transferred material according to claim 1, wherein said interlayer contains a substance imparting a three-dimensional property to said interlayer.

4. The image transferred material according to claim 1, wherein said interlayer contains at least one of dyes, pigments and perfumes.

5. An image transferred material comprising an interlayer formed on a surface of a desired medium and an image layer formed on said interlayer, said image layer and said interlayer being thermally transferred onto said desired medium, said interlayer comprising a perfume and at least one of: (1) a metallic component; (2) a substance imparting a three-dimensional property to the interlayer; and (3) one of a dye and a pigment.

6. The image transferred material according to claim 5, wherein said desired medium comprises one of cloth, paper and plastic film.

7. The image transferred material according to claim 5, wherein said interlayer contains a substance imparting a three-dimensional property to said interlayer.

8. The image transferred material according to claim 5, wherein said interlayer contains an adhesive component and at least one of dyes and pigments.

* * * * *